United States Patent
Tieke et al.

(10) Patent No.: US 7,839,747 B2
(45) Date of Patent: Nov. 23, 2010

(54) METHOD AND RECORDING DEVICE FOR RECORDING MARKS IN AN INFORMATION LAYER OF AN OPTICAL RECORD CARRIER

(75) Inventors: Benno Tieke, Eindhoven (NL); Maarten Van Der Vleuten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 837 days.

(21) Appl. No.: 10/539,366

(22) PCT Filed: Dec. 4, 2003

(86) PCT No.: PCT/IB03/05739

§ 371 (c)(1),
(2), (4) Date: Jun. 15, 2005

(87) PCT Pub. No.: WO2004/057582

PCT Pub. Date: Jul. 8, 2004

(65) Prior Publication Data

US 2006/0209657 A1   Sep. 21, 2006

(30) Foreign Application Priority Data

Dec. 19, 2002  (EP) .................................. 02080394

(51) Int. Cl.
*G11B 5/09* (2006.01)
(52) U.S. Cl. .................................. 369/59.11
(58) Field of Classification Search .............. 369/59.11, 369/59.12
See application file for complete search history.

(56) References Cited

U.S. PATENT DOCUMENTS

| | | | | |
|---|---|---|---|---|
| 5,732,062 | A * | 3/1998 | Yokoi et al. | 369/116 |
| 6,411,579 | B2 | 6/2002 | Nobukuni et al. | |
| 6,469,968 | B1 * | 10/2002 | Van Den Enden et al. | 369/59.12 |
| 6,482,493 | B1 * | 11/2002 | Kim | 428/64.1 |
| 6,515,949 | B2 * | 2/2003 | Masaki et al. | 369/53.11 |
| 6,963,527 | B2 * | 11/2005 | Ohkura et al. | 369/59.11 |
| 2003/0086345 | A1 * | 5/2003 | Ueki | 369/47.51 |
| 2004/0248036 | A1 | 12/2004 | Ohno et al. | |

FOREIGN PATENT DOCUMENTS

| | | |
|---|---|---|
| CN | 1197530 A | 10/1998 |
| EP | 1361571 A1 | 11/2003 |
| EP | 1385157 A2 | 1/2004 |
| JP | 09134525 A | 5/1997 |
| JP | 2001331936 A | 11/2001 |
| JP | 2002264506 A | 9/2002 |
| WO | 03069602 A1 | 8/2003 |

OTHER PUBLICATIONS

Ultra-Speed Compact Disc Rewritable specification (Recordable Compact Disc Systems, Part III: CD-RW, vol. 3: Ultra-Speed, Version 1.0), Sep. 2002.

* cited by examiner

*Primary Examiner*—Wayne R Young
*Assistant Examiner*—Aneeta Yodichkas

(57) ABSTRACT

Recording devices and methods are provided for recording marks on an information layer of a record carrier using a 2T write strategy, which enable recordation of marks on the information layer when no write parameter settings specifically tuned for the record carrier are available for use in the 2T write strategy.

9 Claims, 4 Drawing Sheets

Figure 3:
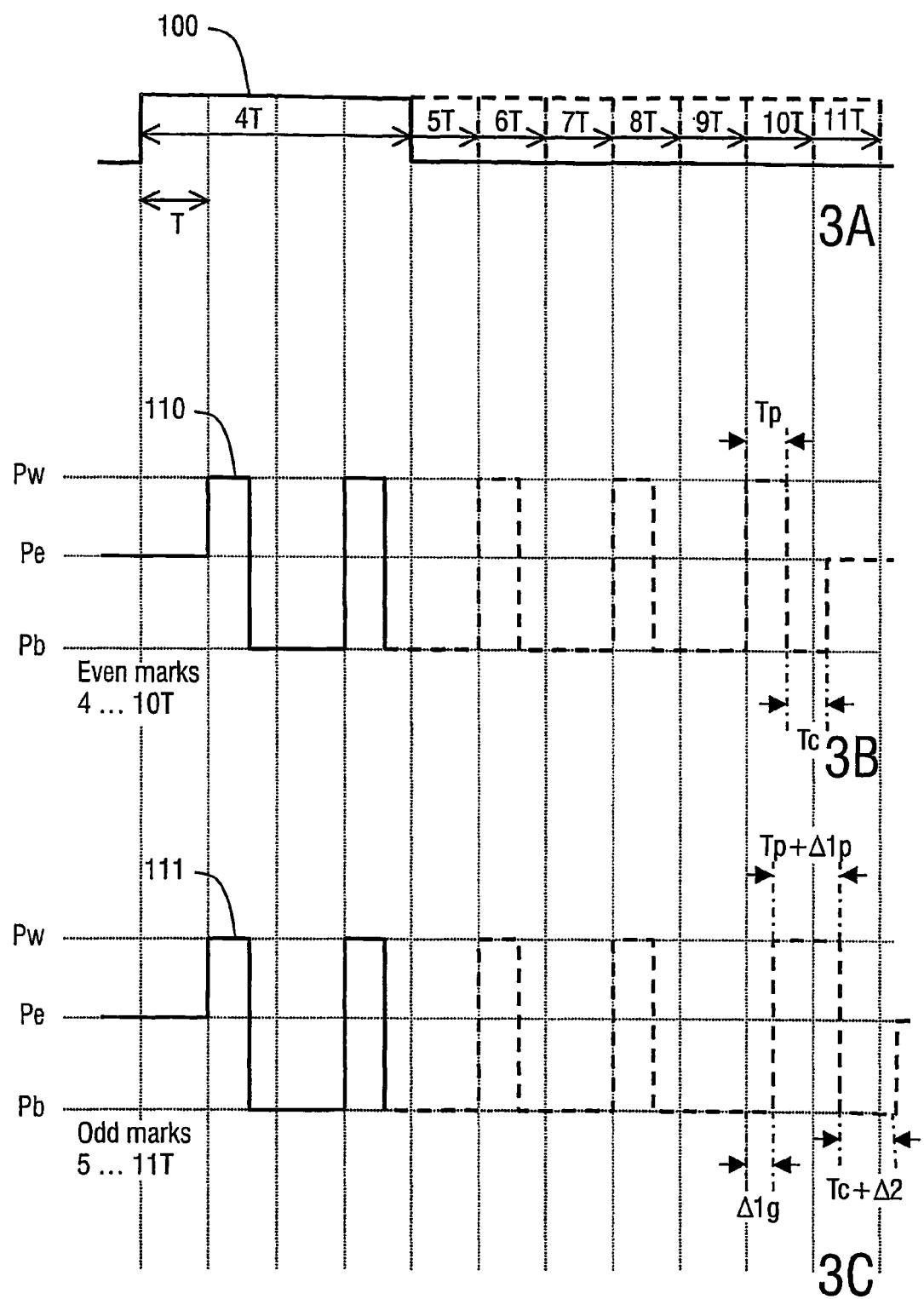

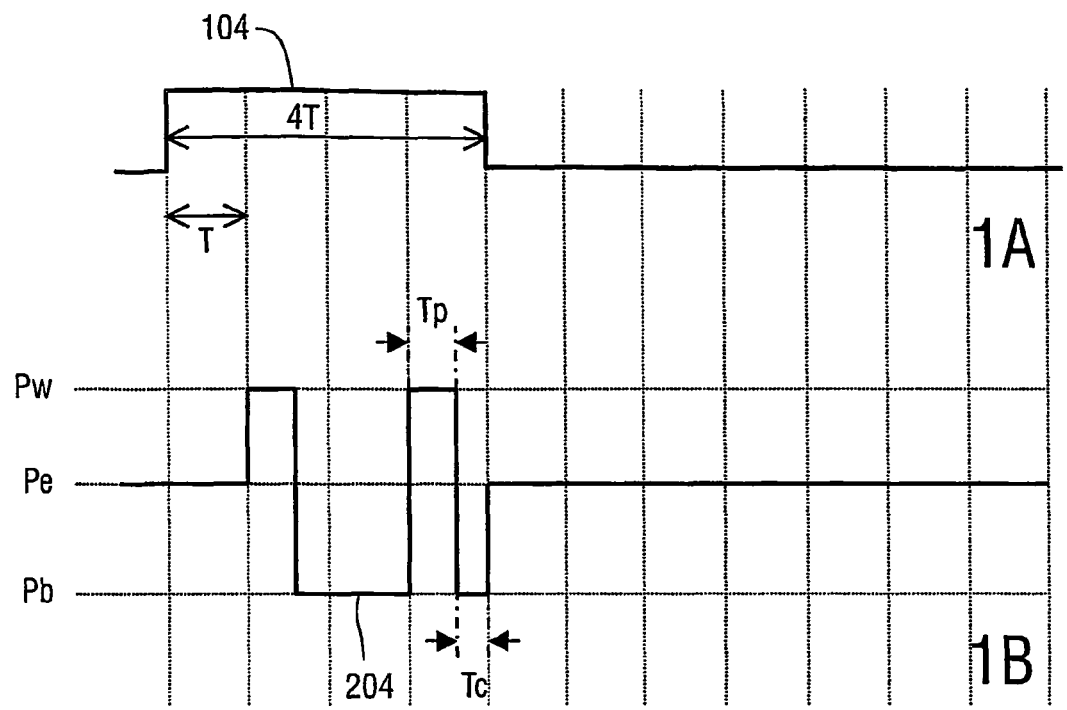
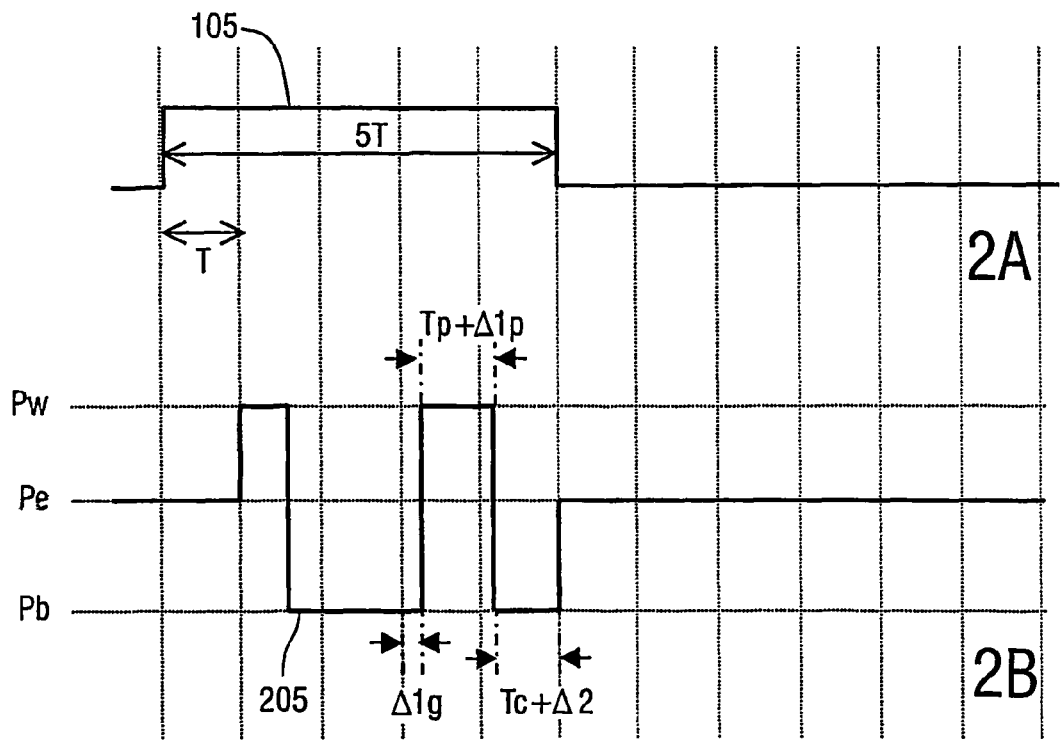
FIG.1
FIG.2

METHOD AND RECORDING DEVICE FOR RECORDING MARKS IN AN INFORMATION LAYER OF AN OPTICAL RECORD CARRIER

The invention relates to a method of recording marks in an information layer of a record carrier by irradiating the information layer by a pulsed radiation beam, said information layer having a phase reversibly changeable between a crystal phase and an amorphous phase, wherein an even mark having a time length of nT, where n is representing an integer value equal to 4, 6, 8, or 10 and T is representing the length of one period of a reference clock, is written by a sequence of n/2 pulses, and wherein an odd mark having a time length of nT, where n is representing an integer value equal to 5, 7, 9 or 11, is written by as sequence of (n−1)/2 pulses.

The invention also relates to a recording device for recording marks in an information layer of a record carrier, said record carrier comprising an information layer having a phase reversibly changeable between a crystal phase and an amorphous phase, capable of carrying out the above method.

An information layer having a phase reversibly changeable between a crystal phase and an amorphous phase is generally known as a phase-change layer. Such a phase-change layer is often applied in optical record carriers of the rewritable type, such as for example CD-ReWritable (CD-RW) discs. A recording operation of optical signals is performed in such a manner that the recording material on the layer is changed in phase reversibly between an amorphous phase and a crystalline phase by changing the irradiation conditions of a radiation beam thereby to record the signals in the phase-change layer, while a playback operation of the recorded signals is performed by detecting differences in optical properties between the amorphous and crystalline phase of the phase-change layer thereby to reproduce the signals. Such a phase-change layer allows information to be recorded and erased by modulating the power of the radiation beam between a write power level and an erase power level.

A method according to the preamble for recording information in a phase-change layer of a record carrier is known from the U.S. Pat. No. 5,732,062. A mark is recorded by a sequence of pulses having a write power level and having a bias power level in between the pulses. The previously recorded marks between the marks being recorded are erased by applying an erase power level in between the sequences of pulses thus allowing this method to be used in a direct-over-write (DOW) mode, that is recording information to be recorded in the information layer of the record carrier and at the same time erasing information previously recorded in the information layer.

A sequence of pulses for writing a mark having a time length of nT consists of (n/2) pulses when n is an even integer (these marks are referred to as even marks), while the sequence consists of (n−1)/2 pulses when n is an odd integer (these marks are referred to as odd marks). Because one pulse is generated every two cycles of the reference clock, this method of recording marks is often referred to as 2T write strategy. This in contrast to known methods of recording a mark in which a pulse is generated every single cycle of the reference clock, such as for example the method also described in U.S. Pat. No. 5,732,062 in which a mark is written by a sequence of (n−1) pulses. The latter methods are often referred to as 1T write strategies.

In order to distinguish an odd mark from an even mark while both are being written by an identical number of pulses in a 2T write strategy, the patterns of pulses and gaps between the pulses in a sequence of pulses, that is the shapes of the pulse-trains, are different in shape between odd-number T length marks and even-number T length marks. This shape of a pulse-train for writing an odd mark may be different from the shape of a pulse-train for writing an even marks in, for example, the duration of one or more pulses in the sequence of pulses and/or in the duration of one or more gaps in between the pulses in a sequence of pulses.

Such a 2T write strategy is specified in the Ultra-Speed Compact Disc Rewritable specification (Recordable Compact Disc Systems, Part III: CD-RW, Volume 3: Ultra-Speed, Version 1.0). Here a write strategy is specified which is divided into even and odd mark lengths and a separately specified 3T mark length. An even mark is written by applying a sequence of n/2 pulses. The first pulse in a sequence for writing an even mark starts on the clock edge of the reference clock at 1T after the start of the EFM signal. The last pulse in the sequence for writing an even mark has a duration of Tp and is succeeded by a cooling gap having a duration of Tc. An odd mark is written by applying a sequence of (n−1)/2 pulses. The first pulse in a sequence for writing an odd mark also starts on the clock edge of the reference clock at 1T after the start of the EFM signal. The last pulse in the sequence for writing an odd mark has a duration of Tp+$\Delta$1 and is succeeded by a cooling gap having a duration of Tc+$\Delta$2. Moreover, the gap preceding the last pulse in the sequence of pulses for writing an odd mark is a period $\Delta$1 longer than the gap preceding the last pulse in the sequence of pulses for writing an even mark. It is noted that, according to the above mentioned Ultra-speed Compact Disc Rewritable specification, all pulses in a sequence of pulses before the last pulse of each sequence have a duration which is equal to the duration of the last pulse in a sequence of pulses for writing an even mark, that is a duration of Tp.

A mark having a time length of 3T is written by a single pulse and a subsequent cooling gap. The single pulse has a duration of Tp+$\Delta$3 and is delayed by $\Delta$T3 relative to the start of the first pulse in a sequence of pulses for writing an even mark. The cooling gap after the single pulse has a duration of Tc+$\Delta$4.

The power level of a pulse in a sequence of pulses is referred to as the write power level (Pw), while the power level between the pulses in a sequence is referred to as the bias power level (Pb). Furthermore, the power level between each sequence of pulses is referred to as erase power level (Pe).

In order for the recorded marks to be of a good quality, that is to have a jitter below a prescribed value, the write parameters for the 2T write strategy (Tp, Tc, $\Delta$1, $\Delta$2, Tp+$\Delta$3=T3, $\Delta$T3, and Tc+$\Delta$4=TC3) should at least be within prescribed ranges as specified in the Ultra-Speed Compact Disc Rewritable specification. However, the actual values for these write parameters depend strongly on the specific type and manufacturer of the record carrier.

For the previously used 1T write strategy the optimal values of its write parameters were prerecorded on each individual record carrier. Before recording information, these optimal values were read from the record carrier by a recording device and used for setting the appropriate 1T write strategy in the recording device. However, for the current 2T write strategy there are no optimum values of its write parameters prerecorded in the record carriers. Instead, a recording device has to determine the manufacturer and media type of the record carrier from a media identifier on the record carrier. When a record carrier is inserted into the recording device, the record carrier is identified by its media identifier and the appropriate settings of the write parameters are selected from a look-up table located in the recording device itself. Such a look-up table is provided by the manufacturer of the disk drive and contains the optimal settings of the write parameters for each individual type of record carrier known to the drive manufacturer. When new record carriers are introduced, the look-up tables in the recording devices should be updated.

However, when a record carrier is inserted into a recording device which can not be identified by the recording device, or which write parameters setting are not available in the look-up table, the recording device is not capable of recording information on the record carrier because it can not set an appropriate 2T write strategy.

It is an object of the present invention to provide a method and a recording device of the kind described in the opening paragraph which result in recorded marks of good quality (that is, having a jitter within the prescribed range), even when the record carrier can not be identified or when its write parameters setting are not available.

This object is achieved by providing a method according to claim 1 and a recording device according to claim 7 in which the sum of the periods $\Delta 1p$, $\Delta 1g$, and $\Delta 2$ is within a range from 0.7T to 1.1T. It appears that when the sequence for writing an mT even mark is prolonged by a total period having a duration close to 1T, a good sequence for writing an (m+1)T odd marks is obtained. This is realized by setting the periods $\Delta 1p$, $\Delta 1g$, and $\Delta 2$ such that their sum is within a range from 0.7T to 1.1T.

It is noted that according to the above-mentioned Ultra-speed Compact Disc Rewritable specification the periods $\Delta 1p$ and $\Delta 1g$ have an equal duration (denoted as $\Delta 1$). However, by allowing these periods to have an unequal duration a more flexible write strategy is obtained in which two write parameters can be optimized independently such that marks of good quality are obtained.

In an embodiment of the invention the sum of the periods $\Delta 1p$ and $\Delta 1g$ is within a range from 0.25T to 0.75T. When the period $\Delta 1p$ is too long, the last pulse in the sequence of pulses induces too much heat in the record carrier resulting in a recrystallization effect (that is, recrystallization of an amorphous area) near the end of the mark being written and subsequently in a recorded mark which is too short. When the period $\Delta 1g$ is too long, this results in a mark having an irregular width (that is, a shape in the direction perpendicular to the scanning direction; for example, the radial direction on a disc shaped record carrier), caused by excessive cooling. It appears that good quality marks are obtained when the sum of the periods $\Delta 1p$ and $\Delta 1g$ is within a range from 0.25T to 0.75T.

In a preferred embodiment of the invention the period $\Delta 1p$ is substantially equal to the period $\Delta 1g$. The additional heat induced by the prolonged last pulse in a sequence of pulses appears to be especially well balanced by the prolonged gap before the last pulse in a sequence when the periods $\Delta 1p$ and $\Delta 1g$ are selected to be of substantially equal duration. Especially good quality marks are obtained without significant recrystallization at the end of the mark being written and without significant irregularities in the width of the mark being written.

In an embodiment according to the invention a mark having a time length of 3T is written by a single pulse and a subsequent cooling gap. It appears that when this sequence for writing an 3T mark is prolonged by a time period having a duration close to 1T compared to the duration of a single pulse and a subsequent cooling gap in the sequence of pulses for writing an even mark, a good sequence for writing a 3T marks is obtained. This is realized when the single pulse is a period $\Delta 3$ longer than the last pulse in the sequence of pulses for writing an even mark and the subsequent cooling gap is a period $\Delta 4$ longer than the cooling gap succeeding the last pulse in the sequence of pulses for writing an even mark, where the sum of the periods $\Delta 3$ and $\Delta 4$ is within a range from 0.7T to 1.1T.

In a preferred embodiment of the invention the values for the write parameters for the 2T write strategy are selected to be such that the duration of the last pulse in the sequence of pulses for writing an even mark (Tp) is substantially equal to 7.2 ns, the period $\Delta 1p$ has a duration substantially equal to 2/8T, the period $\Delta 1g$ has a duration substantially equal to 2/8T, the duration of the cooling gap succeeding the last pulse in the sequence of pulses for writing an even mark (Tc) is substantially equal to 5/8T, the period $\Delta 2$ has a duration substantially equal to 3/8T, the period $\Delta 3$ has a duration substantially equal to 7/8T−7.2 ns (=3/8T at 16×), and the period $\Delta 4$ has a duration substantially equal to 5/8T. With this selection of write parameters settings, good quality marks are recorded on most record carriers. This is especially so when recording is performed on an Ultra-Speed CD-RW disc at 16×, that is, 16 times the standard recording speed according to the CD-ReWritable specifications. Now, good quality marks are obtained even when the Ultra-Speed CD-RW disc is specified to have a maximum recording speed higher than 16×, such as 24×.

An even further improvement of the quality of the recorded marks is obtained when the start of the single pulse for writing a mark having a time length of 3T relative to the start of a period of the reference clock corresponds to the start of the first pulse in the sequence of pulses for writing an even mark relative to the start of a period of the reference clock.

The object of the invention is alternatively achieved by a recording device according to claim 8 which comprises an identification unit operative for identifying the record carrier, and a selection unit operative for selecting a set of write parameters from a collection of sets of write parameters based on the identification of the record carrier. When a record carrier is inserted into the recording device, the record carrier is identified by the identification unit (for example by its media identifier) and the appropriate settings of the write parameters are selected by the selection unit from a collection of sets of write parameters. The collection of sets of write parameters may, for example, be stored in a look-up table located in the recording device itself. The selection unit now provides a control unit operative for providing the sequences of write pulses with the appropriate settings of the write parameters. However, when the identification unit is incapable of identifying the record carrier or when the selection unit is incapable of selecting an appropriate set of write parameters from the collection of sets of write parameters, for example because no such set for the specific record carrier was stored in the look-up table, the selection unit provides the control unit with settings of the write parameters such that the control unit will provide sequences of pulses according to any of the methods according to the invention. Using these settings, the recording device will now be able to record information on the record carrier even though the record carrier can not be identified or specific write parameters setting are not available.

Figure 4:
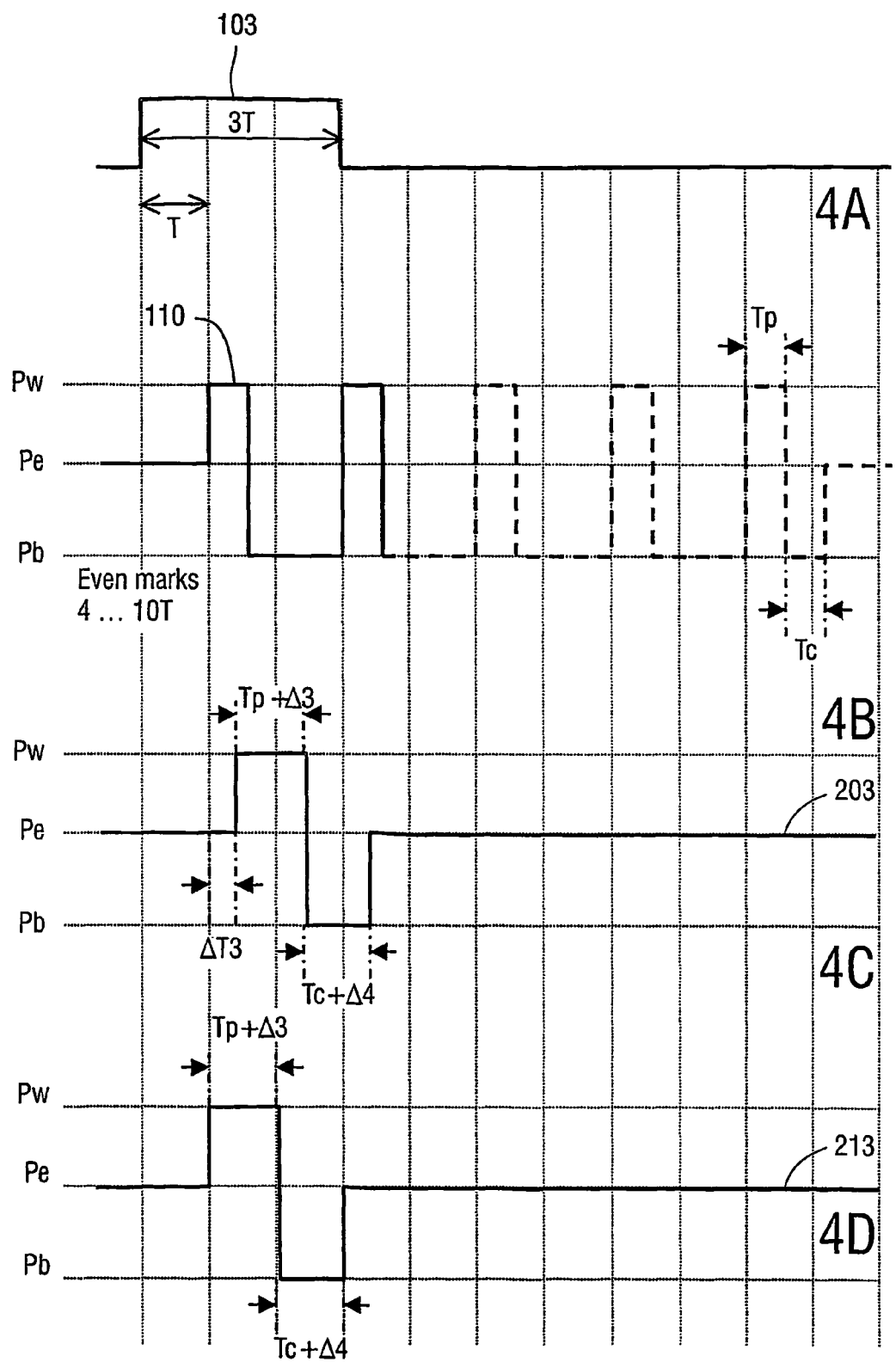
Figure 5:
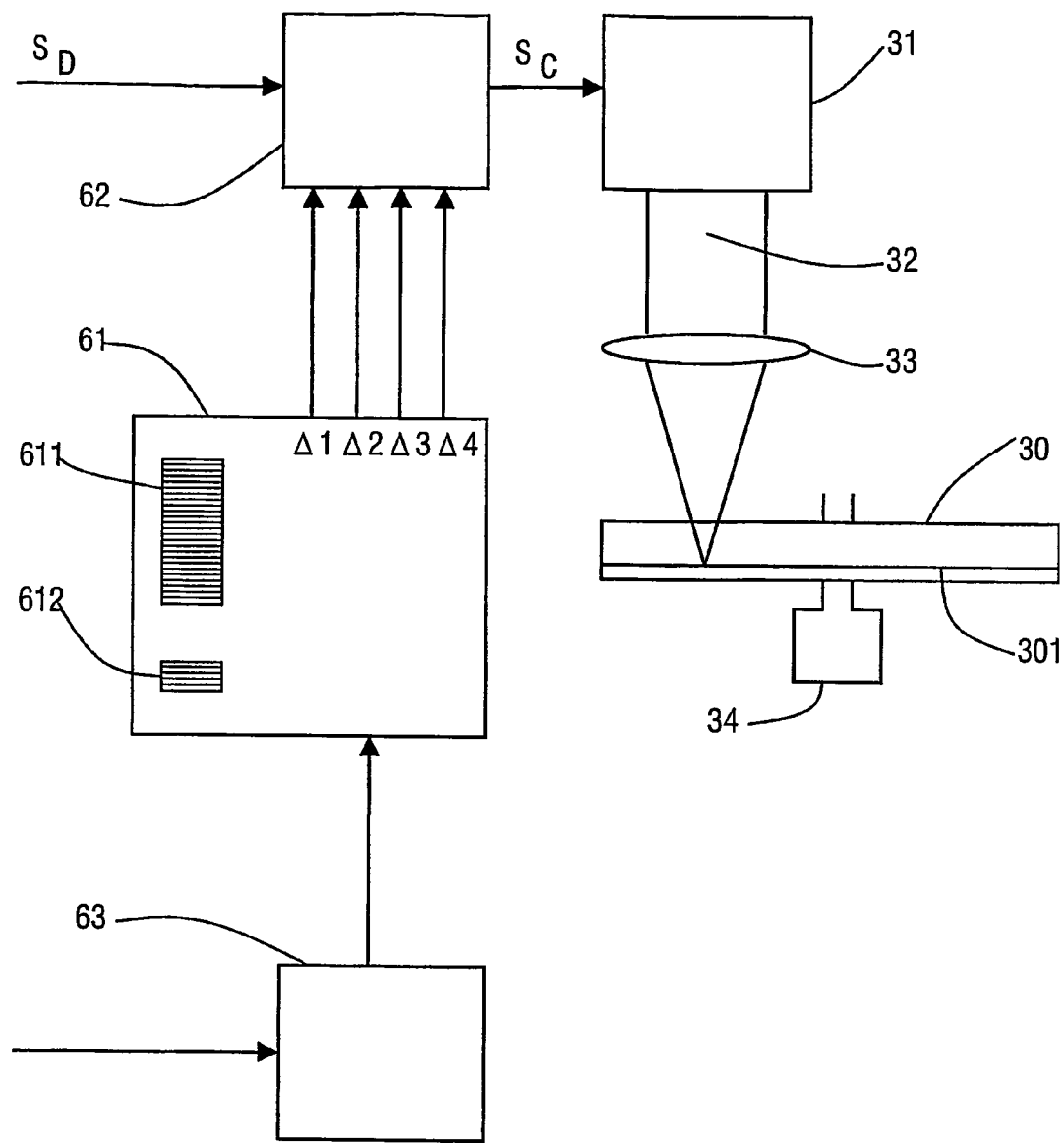

These and other objects, features and advantages of the invention will be apparent from the following more particular description of an embodiment of the invention, as illustrated in the accompanying drawings where FIG. 1 shows diagrams of the time-dependency of a digital data signal and of a control signal for controlling the power of the radiation beam for recording a 4T even mark, FIG. 2 shows diagrams of the time-dependency of a digital data signal and of a control signal for controlling the power of the radiation beam for recording a 5T odd mark, FIG. 3 shows schematic diagrams of the time-dependency of a digital data signal and of control signals for controlling the power of the radiation beam for recording even and odd marks, FIG. 4 shows diagrams of the time-dependency of a digital data signal and of a control signal for controlling the power of the radiation beam for recording a 3T mark, and FIG. 5 shows a recording device according to an embodiment of the invention.

FIGS. 1A and 2A show digital data signals 104,105 as a function of time. The values of these digital data signal represent the lengths of marks to be recorded in the information layer 301 of a record carrier 30 (see FIG. 5). The vertical dotted lines indicate transitions in a reference clock signal belonging to the data signals. One period of this reference clock, also called the channel bit period, is indicated by T. FIG. 1A shows a digital data signal 104 to be recorded as a 4T mark, that is a mark having a length substantially equal to the duration of 4 periods of the reference clock times the writing speed. FIG. 2A shows a digital data signal 105 to be recorded as a 5T mark, that is a mark having a length substantially equal to the duration of 5 periods of the reference clock times the writing speed.

FIGS. 1B and 2B show control signals 204,205 related to the digital data signals 102,105. These control signals are used to control the power of the radiation beam, where it is assumed that the power of the radiation beam is proportional to the corresponding level of the control signal. A marks is recorded by a sequence of pulses having a write power level Pw and having a bias power level Pb in between the pulses. Previously recorded marks between the marks being recorded are erased by applying an erase power level Pe.

When a mark having a time length of 4T and a mark having a time length of 5T are to be recorded by a 2T write strategy, both marks are recorded by a sequence of pulses consisting of two pulses. FIG. 1B shows a control signal 204 for recording the 4T mark while FIG. 2B shows a control signal 205 for recording the 5T mark. Although both marks are recorded by a sequence of two pulses, an appropriate mark length for the 5T marks is obtained when in the control signal 205 for recording the 5T marks the last pulse in the sequence is extended by a period $\Delta 1p$ (such that its duration becomes Tp+$\Delta 1p$), the gap preceding the last pulse is extended by a period $\Delta 1g$, and the cooling gap succeeding the last pulse is extended by a period $\Delta 2$ (such that its duration becomes Tc+$\Delta 2$) compared to control signal 204 for recording the 4T signal, and the sum of the periods $\Delta 1g$, $\Delta 1p$, and $\Delta 2$ is within a range from 0.7T to 1.1T. In a preferred embodiment the sum of the periods $\Delta 1g$ and $\Delta 1p$ is within a range from 0.25T to 0.75T.

FIG. 3A schematically shows digital data signals 100 representing marks to be recorded in the range from 4T to 11T. FIG. 3B schematically shows the corresponding control signals 110 for recording the even marks, that is the 4T, 6T, 8T, and 10T marks, while FIG. 3C schematically shows the corresponding control signals 111 for recording the odd marks, that is the 5T, 7T, 9T, and 11T marks. Because a 2T write strategy is used, the even marks having a time length of nT are recorded by a sequence of n/2 pulses, and the odd marks having a time length of nT are recorded by a sequence of (n−1)/2 pulses. This results in a 4T even mark and a 5T odd mark being recorded by a sequence of 2 pulses, a 6T even mark and a 7T odd mark being recorded by a sequence of 3 pulses, a 8T even mark and a 9T odd mark being recorded by a sequence of 4 pulses, and a 10T even mark and a 11T odd mark being recorded by a sequence of 5 pulses. To obtain recorded marks of good quality (that is, having a jitter within the prescribed range) for both the even marks and the odd marks, the sequence of pulses for recording the odd marks are adjusted such that the last pulse in the sequence of pulses for writing an odd mark is a period $\Delta 1p$ longer than a last pulse in the sequence of pulses for writing an even mark having a duration Tp, a gap preceding the last pulse in the sequence of pulses for writing an odd mark is a period $\Delta 1g$ longer than a gap preceding the last pulse in the sequence of pulses for writing an even mark, a cooling gap succeeding the last pulse in the sequence of pulses for writing an odd mark is a period $\Delta 2$ longer than a cooling gap succeeding the last pulse in the sequence of pulses for writing an even mark having a duration Tc, and the sum of the periods $\Delta 1p$, $\Delta 1g$, and $\Delta 2$ is within a range from 0.7T to 1.1T.

According to an embodiment of the invention a good selection for the values of the write parameters Tp, Tc, $\Delta 1g$, $\Delta 1p$, and $\Delta 2$ appears to be Tp=7.2 ns, Tc=5/8T, $\Delta 1g$=2/8T, $\Delta 1p$=2/8T, and $\Delta 2$=3/8T.

FIG. 4A shows a digital data signal 103 to be recorded as a 3T mark. A 3T mark is the shortest mark length to be recorded when the in CD-systems well known EFM (Eight-to-Fourteen Modulation) coding scheme is used. For reference purposes, FIG. 4B (corresponding to FIG. 3B) schematically shows the control signals 110 for recording even marks. FIG. 4C shows a control signal 203 relating to the digital data signal 103 according to a first embodiment. According to this embodiment, a mark having a time length of 3T is written by a single pulse which is a period $\Delta 3$ longer than the last pulse in the sequence of pulses for writing an even mark (such that its duration becomes Tp+$\Delta 3$) and a subsequent cooling gap which is a period $\Delta 4$ longer than the cooling gap succeeding the last pulse in the sequence of pulses for writing an even mark (such that its duration becomes Tc+$\Delta 4$), the sum of the periods $\Delta 3$ and $\Delta 4$ being within a range from 0.7T to 1.1T.

The start of the single pulse for writing a mark having a time length of 3T is delayed by a period $\Delta T3$ relative to the start of the first pulse in a sequence of pulses for writing an even mark. FIG. 4D shows a control signal 213 relating to the digital data signal 103 according to a second embodiment. In this embodiment the delay period $\Delta T3$ is substantially equal to zero, such that the start of the single pulse for writing a mark having a time length of 3T relative to the start of a period of the reference clock corresponds to the start of the first pulse in the sequence of pulses for writing an even mark relative to the start of a period of the reference clock.

According to an embodiment of the invention a good selection for the values of the write parameters $\Delta 3$, and $\Delta 4$ appears to be $\Delta 3$=7/8T−7.2 ns and $\Delta 4$=5/8T.

It is noted that the periods $\Delta 1g$ and $\Delta 1p$ may have different durations. However, according to an embodiment of the invention they may alternatively have substantially equal durations ($\Delta 1g$=$\Delta 1p$=$\Delta 1$). This allows for simplified electronic circuitry in the recording device. Furthermore, all pulses in the sequences of pulses for writing the even and the odd marks except for the last pulse in the sequences of pulses for writing an odd marks may have equal durations Tp, again allowing for simplified electronic circuitry in the recording device.

FIG. 5 shows an embodiment of a recording device according to the invention for recording marks in an information layer 301 of a disc-shaped record carrier 30. The information layer 301 is of the so-called phase-change type, that is, it has a phase reversibly changeable between a crystal phase and an amorphous phase. The record carrier is rotated around its center by a motor 34. A radiation beam is generated by a radiation source 31, such as for example a laser light source, and focused onto the information layer by a lens 33.

The power of the radiation beam 32 generated by the radiation source 31 is controlled by a control signal $S_C$ provided by a control unit 62, where it is assumed that the power of the radiation beam 32 is proportional to the corresponding level of the control signal $S_C$. Examples of such a control signal $S_C$ can be found in FIGS. 1B, 2B, 3B, 3C, 4C and 4D.

The control unit 62 converts a digital data signal $S_D$ representing the length of a mark to be recorded in the information layer 301 of a record carrier 30 into a corresponding control signal $S_C$. This conversion is based on a so-called write strategy. In the 2T write strategy according to the invention a digital data signal $S_D$ representing an even mark having a time length of nT, where n is representing an integer value equal to 4, 6, 8, or 10 and T is representing the length of one period of a reference clock, is converted into a control signal $S_C$ comprising a sequence of n/2 pulses, while a digital data signal $S_D$ representing an odd mark having a time length of nT, where n is representing an integer value equal to 3, 5, 7, 9 or 11, is converted into a control signal $S_C$ comprising a sequence of (n−1)/2 pulses. As an example, FIG. 1A shows a control signal 104 while FIG. 1B shows a corresponding control signal 204, and FIG. 4A shows a control signal 103 while FIG. 4D shows a corresponding control signal 204.

The patterns of the pulses and the gaps between the pulses in a control signal $S_C$ are based on a set of write parameters related to the 2T write strategy, which write parameters are provided to the control unit 62 by a selection unit 61. FIG. 5 schematically shows four write parameters $\Delta 1$, $\Delta 2$, $\Delta 3$, and $\Delta 4$ provided by the selection unit 61 to the control unit 62. However, alternatively, a smaller or larger number of write parameters may be provided by the selection unit 61 to the control unit 62, such as for example when $\Delta 1g$ and $\Delta 1p$ do not have a substantial equal duration and both are provided separately to the control unit 62. The set of write parameters are selected by the selection unit 61 from a collection of sets of write parameters based on an identification of the record carrier performed by an identification unit 63. Such an identification is for example based on an media identifier stored on the record carrier. The identification process itself is well know from prior art and is therefore not discussed in this application. The collection of sets of write parameters is for example stored in a look-up table 611.

However, when the identification unit 63 is incapable of identifying the record carrier 30 or when the selection unit 61 is incapable of selecting an appropriate set of write parameters from the collection of sets of write parameters, for example because no such set for the specific record carrier was stored in the look-up table 611, the selection unit 61 provides the control unit 62 with a default set of write parameters, for example stored in a default write parameters table 612, such that the control unit 62 will provide control signals $S_D$ according to one of the methods according to the invention.

The invention claimed is:

1. A method of recording marks on an information layer of a record carrier, the method comprising acts of:
   irradiating an information layer with a pulsed radiation beam to record marks on said information layer, said information layer having a phase that is reversibly changeable between a crystal phase and an amorphous phase; and
   writing an even mark having a time length of nT by a sequence of n/2 pulses, where n denotes an even integer value selected from 4, 6, 8, or 10 and T denotes a length of one period of a reference clock, and an odd mark having a time length of nT by a sequence of (n−1)/2 pulses, where n denotes an odd integer value selected from 5, 7, 9 or 11,
   wherein a last pulse in the sequence of pulses for writing the odd mark has a period that is a first period difference $\Delta 1p$ longer than a last pulse in the sequence of pulses for writing the even mark, a gap preceding the last pulse in the sequence of pulses for writing the odd mark has a first gap difference $\Delta 1g$ longer than a gap preceding the last pulse in the sequence of pulses for writing an even mark, the first gap and first period differences $\Delta 1g$ and $\Delta 1p$ have an unequal duration not equal to T, a cooling gap succeeding the last pulse in the sequence of pulses for writing an odd mark has a period that is a second difference $\Delta 2$ longer than a cooling gap succeeding the last pulse in the sequence of pulses for writing an even mark, and a sum of the first gap, first period, and second differences $\Delta 1p$, $\Delta 1g$, and $\Delta 2$ is within a range from 0.7T to 1.1T.

2. The method according to claim 1, wherein the sum of the first gap and first period differences $\Delta 1p$ and $\Delta 1g$ is within a range from 0.25T to 0.75T.

3. The method according to claim 1, wherein a mark having a time length of 3T is written by a single pulse having a third difference $\Delta 3$ longer than the last pulse in the sequence of pulses for writing an even mark, and wherein a subsequent cooling gap has a fourth difference $\Delta 4$ longer than the cooling gap succeeding the last pulse in the sequence of pulses for writing an even mark, and wherein a sum of the third and fourth differences $\Delta 3$ and $\Delta 4$ is within a range from 0.7T to 1.1T.

4. The method according to claim 3, wherein a duration of the last pulse in the sequence of pulses for writing an even mark (Tp) is substantially equal to 7.2 ns;
   wherein the duration of the cooling gap succeeding the last pulse in the sequence of pulses for writing an even mark (Tc) is substantially equal to 5/8T; the second difference $\Delta 2$ has a duration substantially equal to 3/8T;
   wherein the third difference $\Delta 3$ has a duration substantially equal to 7/8T−7.2 ns; and
   wherein the fourth difference $\Delta 4$ has a duration substantially equal to 5/8T.

5. The method according to claim 4, wherein a start of the single pulse for writing a mark having a time length of 3T relative to the start of a period of the reference clock corresponds to the start of the first pulse in the sequence of pulses for writing an even mark relative to the start of a period of the reference clock.

6. A recording device for recording marks on an information layer of a record carrier, the device comprising:
   a radiation source configured to generate a radiation beam to irradiate an information layer using a pulsed radiation beam to record marks on said information layer, wherein each mark is written by a sequence of one or more pulses, and wherein said information layer has a phase that is reversibly changeable between a crystal phase and an amorphous phase, and
   a control unit configured to control power of the radiation beam and to provide the sequences of pulses for recording the marks such that an even mark having a time length of nT is recorded by a sequence of n/2 pulses, where n denotes an even integer value selected from 4, 6, 8, or 10, and where T denotes a length of one period of a reference clock, and such that an odd mark having a time length of nT is written by sequence of (n−1)/2 pulses, where n denotes an odd integer value selected from 5, 7, 9 or 11, wherein a last pulse in the sequence of pulses for writing the odd mark has a period that is a first period difference $\Delta 1p$ longer than a last pulse in the sequence of pulses for writing an even mark, a gap preceding the last pulse in the sequence of pulses for writing the odd mark has a first gap difference $\Delta 1g$ longer than a gap preceding the last pulse in the sequence of pulses for writing an even mark, the first gap and first period differences $\Delta 1g$ and $\Delta 1p$ have an unequal duration not equal to T, a cooling gap succeeding the last pulse in the sequence of pulses for writing an odd mark has a period that is a second difference $\Delta 2$ longer than a cooling gap succeeding the last pulse in the sequence of pulses for writing an even mark, and the sum of the first gap, first period, and second differences periods $\Delta 1p$, $\Delta 1g$, and $\Delta 2$ is within a range from 0.7T to 1.1T.

7. The recording device according to claim 6, wherein the sum of the first gap and first period differences $\Delta 1p$ and $\Delta 1g$ is within a range from 0.25T to 0.75T.

8. The recording device according to claim 6, wherein the control unit is further configured to generate a sequence of pulses for recording a mark having a time length of 3T, said sequence of pulses for recording a mark having a time length of 3T comprising a single pulse having a third difference $\Delta 3$ longer than the last pulse in the sequence of pulses for writing an even mark, and a subsequent cooling gap being a fourth difference $\Delta 4$ longer than the cooling gap succeeding the last pulse in the sequence of pulses for writing an even mark, the sum of the third and fourth differences $\Delta 3$ and $\Delta 4$ being within a range from 0.7T to 1.1T.

9. A recording device for recording marks on an information layer of a record carrier, the device comprising:
- a radiation source configured to generate a radiation beam to irradiate an information layer using a pulsed radiation beam to record marks on said information layer, wherein each mark is written by a sequence of one or more pulses, and wherein said information layer has a phase that is reversibly changeable between a crystal phase and an amorphous phase,
- a control unit configured to control power of the radiation beam and to provide sequences of pulses for recording the marks, wherein the pattern of pulses and gaps between the pulses in a sequence of pulses is based on a set of write parameters selected from first gap, first period, second, third, fourth and differences $\Delta 1p$, $\Delta 1g$, $\Delta 2$, $\Delta 3$, $\Delta 4$ provided to the control unit,
- an identification unit configured to identify the record carrier, and
- a selection unit configured to select a set of write parameters from a collection of sets of write parameters based on an identification of the record carrier and to provide the control unit with the selected set of write parameters,
wherein the selection unit is further configured to provide the control unit with a default set of write parameters when the identification unit is incapable of identifying the record carrier or the selection unit is incapable of selecting a set of write parameters from the collection of sets of write parameters based on the identification of the record carrier or if the identification unit and the selection unit is incapable of said identifying and selecting, respectively, said default set of write parameters are such that an even mark having a time length of nT is recorded by a sequence of n/2 pulses, where n denotes an even integer value selected from 4, 6, 8, or 10 and T denotes a length of one period of a reference clock, and an odd mark having a time length of nT is written by as sequence of (n−1)/2 pulses, where n is representing an odd integer value selected from 5, 7, 9 or 11,
wherein a last pulse in the sequence of pulses for writing the odd mark has a period that is a first period difference $\Delta 1p$ longer than a last pulse in the sequence of pulses for writing an even mark, a gap preceding the last pulse in the sequence of pulses for writing the odd mark has a first gap difference $\Delta 1g$ longer than a gap preceding the last pulse in the sequence of pulses for writing an even mark, the first gap and first period differences $\Delta 1g$ and $\Delta 1p$ have an unequal duration not equal to T, a cooling gap succeeding the last pulse in the sequence of pulses for writing an odd mark has a period that is a second difference $\Delta 2$ longer than a cooling gap succeeding the last pulse in the sequence of pulses for writing an even mark, and wherein a sum of the first gap, first period, and second differences $\Delta 1p$, $\Delta 1g$, and $\Delta 2$ is within a range from 0.7T to 1.1T.

* * * * *